Jan. 9, 1923.

F. GAHM.
STEERING GEAR FOR AUTOMOBILES.
FILED MAY 31, 1922.

1,441,843.

Inventor:
Frank Gahm
By
Att'ys.

Patented Jan. 9, 1923.

1,441,843

UNITED STATES PATENT OFFICE.

FRANK GAHM, OF STREATOR, ILLINOIS.

STEERING GEAR FOR AUTOMOBILES.

Application filed May 31, 1922. Serial No. 564,826.

*To all whom it may concern:*

Be it known that I, FRANK GAHM, a citizen of the United States, and resident of Streator, county of La Salle, and State of Illinois, have invented certain new and useful Improvements in Steering Gears for Automobiles, of which the following is a specification, and which are illustrated in the accompanying drawings, forming a part thereof.

The invention relates to the steering gear of automobiles, and particularly to the connection at the bottom of the steering column or shaft.

It has been a common practice to fix a crank arm to the lower end of the steering shaft and connect this arm either directly or indirectly to the wheel brackets by means of a rod. This arrangement has the disadvantage of requiring the operator to maintain a firm grasp on the steering wheel.

The object of this invention is to provide a gear connection between the steering shaft and the crank arm at its lower end, this connection being adapted to maintain the steering apparatus in central position with sufficient security to relieve the operator in great measure from the necessity of holding the car to the road.

The invention consists of a device such as is hereinafter described and illustrated in the accompanying drawings, in which Fig. 1 is a detail side view of the mechanism and a part of the frame of a car;

Figure 1:
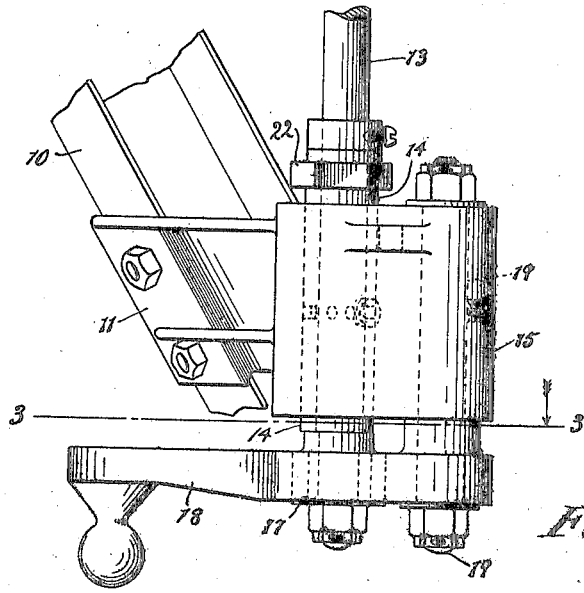
Figure 2:
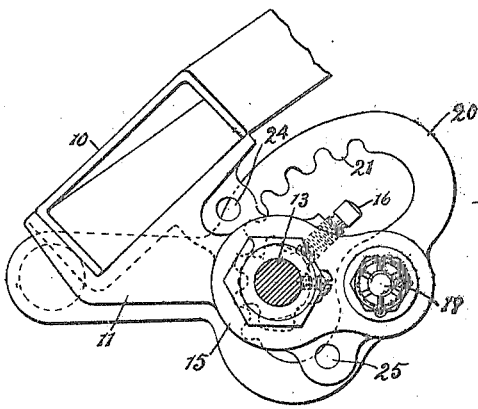
Fig. 2 is a top plan view of the same.
Figure 3:
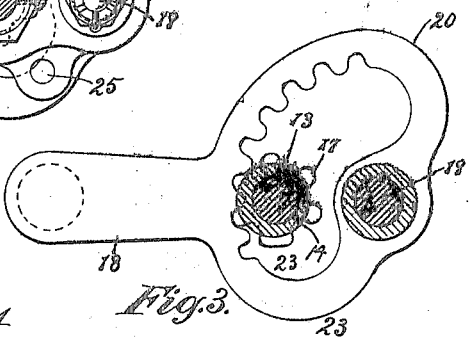
Fig. 3 is a cross-section on the line 3—3 of Fig. 1.
Figure 4:
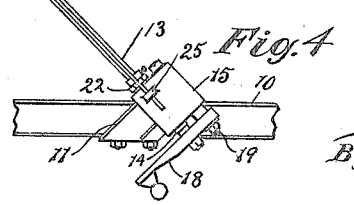
Fig. 4 is a detail side elevation of the apparatus in assembled position.

A part of the frame of an automobile is represented at 10, and at 11, 12, are shown brackets secured to the frame for supporting the steering shaft 13.

The shaft 13 is journaled in an eccentric sleeve 14, mounted to turn in a bearing block 15 carried by the bracket 11, and held in adjusted position by a set-screw 16. A pinion 17 is fixed upon the shaft 13 below the sleeve 14.

The crank arm 18, adapted for the attachment of a rod (not shown) associated with the wheel brackets, is pivoted upon a stud shaft 19 set through the block 15, parallel with the shaft 13. The inner end of the crank arm 18 is given the form of a loop or yoke 20, which incloses the pinion 17 and is provided with a segmental rack bar 21 for engagement therewith. The turning of the shaft 13 swings the crank arm for steering the vehicle. The curvature of the rack bar 21 is slightly flattened at the median portion thereof, thereby causing a sufficiently close engagement with the pinion 17 to prevent movement with ordinary road conditions, the engagement of the pinion with the end portions of the rack being, however, sufficiently free to permit the easy turning of the shaft 13 by the usual hand wheel.

The sleeve 14 projects slightly above the block 15, and is provided at its upper end with a hexagonal head 22, to which a wrench may be applied for the purpose of adjustment to take up any wear which may occur between the pinion and rack bar. One of the teeth, as 23, of the pinion 17 is enlarged to form a stop for limiting the turning movement of the shaft 13, and to prevent the rack bar from being thrown out of engagement with the pinion by excessive movement of the vehicle wheel. At 24, 25, are shown apertures in the block 15 for accommodating the usual rods for controlling the ignition mechanism and the carbureter throttle.

I claim as my invention—

In a steering apparatus for automobiles, in combination, a steering shaft, a block for supporting the lower end of the shaft, a pinion on the shaft, a stud shaft carried by the block, a crank arm carried by the stud shaft and having a transverse segmental gear rack in engagement with the pinion, the curvature of the median portion of the rack being less than that of the end portions thereof, an eccentric sleeve journaled in the block and forming a bearing for the steering shaft, and means for securing the sleeve in adjusted positions.

FRANK GAHM.